US011906911B2

(12) United States Patent
Gyotoku et al.

(10) Patent No.: US 11,906,911 B2
(45) Date of Patent: Feb. 20, 2024

(54) DEVELOPING DEVICE AND IMAGE FORMING APPARATUS INCLUDING DEVELOPER CONVEYING MEMBER AND TONER CONCENTRATION SENSOR

(71) Applicant: KYOCERA Document Solutions Inc., Osaka (JP)

(72) Inventors: Eiji Gyotoku, Osaka (JP); Akihiro Watanabe, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/863,314

(22) Filed: Jul. 12, 2022

(65) Prior Publication Data

US 2023/0022432 A1 Jan. 26, 2023

(30) Foreign Application Priority Data

Jul. 19, 2021 (JP) ................................ 2021-118468

(51) Int. Cl.
*G03G 15/08* (2006.01)

(52) U.S. Cl.
CPC ..... *G03G 15/0891* (2013.01); *G03G 15/0849* (2013.01); *G03G 15/0893* (2013.01); *G03G 15/0896* (2013.01); *G03G 15/0853* (2013.01); *G03G 2215/083* (2013.01); *G03G 2215/0819* (2013.01); *G03G 2215/0822* (2013.01); (Continued)

(58) Field of Classification Search
CPC ........... G03G 15/0891; G03G 15/0849; G03G 15/0893; G03G 2215/083; G03G 15/0853; G03G 15/0851; G03G 15/105; G03G 2215/0888; G03G 2215/0827; G03G 2215/0819; G03G 2215/0822; G03G 15/0877; G03G 15/0896
See application file for complete search history.

(56) References Cited

U.S. PATENT DOCUMENTS

| | | | | |
|---|---|---|---|---|
| 5,887,224 A * | 3/1999 | Mizuishi | G03G 15/0822 | 399/256 |
| 2007/0098449 A1* | 5/2007 | Kadota | G03G 15/09 | 399/258 |
| 2010/0260507 A1* | 10/2010 | Kakubari | G03G 15/0853 | 399/30 |

FOREIGN PATENT DOCUMENTS

| | | |
|---|---|---|
| EP | 0095050 B1 * | 4/1988 |
| JP | 9-146352 A | 6/1997 |

* cited by examiner

*Primary Examiner* — Arlene Heredia
*Assistant Examiner* — Laura Roth
(74) *Attorney, Agent, or Firm* — Stein IP, LLC

(57) ABSTRACT

A development device includes a development container, a first conveying member, a second conveying member, a toner concentration sensor, and a developer carrier. The toner concentration sensor is arranged at a wall portion of the first conveying chamber in which the first conveying member is arranged. The first and second conveying members are equal to each other in outer diameter and shaft diameter, the outer diameter being 2.3 times the shaft diameter or more but 3.0 times the shaft diameter or less. Where D represents the shaft diameter of the first conveying member, L represents an axial length of the first conveying member, and K represents a distance of a center position of a sensing surface of the toner concentration sensor from a downstream end of the first conveying chamber in the first direction, formula (1) is satisfied: $500<(L^2 \times K)/D^4<2500$ (1).

4 Claims, 3 Drawing Sheets

(52) U.S. Cl.
CPC ............... *G03G 2215/0827* (2013.01); *G03G 2215/0888* (2013.01)

DEVELOPING DEVICE AND IMAGE FORMING APPARATUS INCLUDING DEVELOPER CONVEYING MEMBER AND TONER CONCENTRATION SENSOR

INCORPORATION BY REFERENCE

This application is based on and claims the benefit of priority from Japanese Patent Application No. 2021-118468 filed on Jul. 19, 2021, the contents of which are hereby incorporated by reference.

BACKGROUND

The present disclosure relates to a developing device and an image forming apparatus provided therewith.

In electrophotographic image forming apparatuses, such as electrophotographic copiers and printers, a device is widely used that develops an electrostatic latent image formed on a surface of an image carrier, such as a photoconductive drum, by supplying toner to the electrostatic latent image, to thereby form a toner image, which will then be transferred onto a sheet. For continuous formation of uniform images, a developing device conveys, while stirring in a development container, a developer that includes a toner and is stored in the development container.

SUMMARY

According to one aspect of the present disclosure, a developing device includes a development container, a first conveying member, a second conveying member, a developer supply port, a toner concentration sensor, and a developer carrier. The development container includes a first conveying chamber and a second conveying chamber arranged parallel to each other and communicating with each other at opposite end portion sides thereof in longitudinal directions thereof, and the development container stores a two-component developer including a toner and a carrier. The first conveying member is rotatably arranged in the first conveying chamber, and conveys, while stirring, the developer in the first conveying chamber in a first direction along the longitudinal direction of the first conveying chamber. The second conveying member is rotatably arranged in the second conveying chamber, and conveys, while stirring, the developer in the second conveying chamber in a second direction along the longitudinal direction of the second conveying chamber, the second direction being opposite to the first direction. The developer supply port is formed in an upstream-side wall portion of the first conveying chamber in the first direction, and the developer is supplied to the first conveying chamber through the developer supply port. The toner concentration sensor is arranged at a wall portion of the first conveying chamber along the first direction, and detects a toner concentration of the developer. The developer carrier is rotatably supported in the development container, and carries thereon the developer in the second conveying chamber. The first conveying member and the second conveying member each include a rotation shaft extending along a longitudinal direction of the development container and a conveying blade formed on an outer circumferential portion of the rotation shaft, and are equal to each other in outer diameter and shaft diameter, the outer diameter being 2.3 times the shaft diameter or more but 3.0 times the shaft diameter or less. The toner concentration sensor is a headless sensor and has a sensing surface embedded in an inner wall surface of the first conveying chamber. A center of the sensing surface of the toner concentration sensor is located in a region extending downstream, in the first direction, from a center of the first conveying chamber in the longitudinal direction of the first conveying chamber, for a length that is equal to or less than one fourth of an entire length of the first conveying chamber in the longitudinal direction thereof. Where the shaft diameter of the first conveying member is represented by D, an axial length of the first conveying member is represented by L, and a distance of a position of the center of the sensing surface of the toner concentration sensor from a downstream end of the first conveying chamber in the first direction is represented by K, formula (1) below is satisfied:

$$500<(L^2\times K)/D^4<2500 \quad (1).$$

DETAILED DESCRIPTION

An embodiment of the present disclosure will be described hereinbelow with reference to the drawings. The present disclosure is not limited to what is specifically mentioned below.

Figure 1:
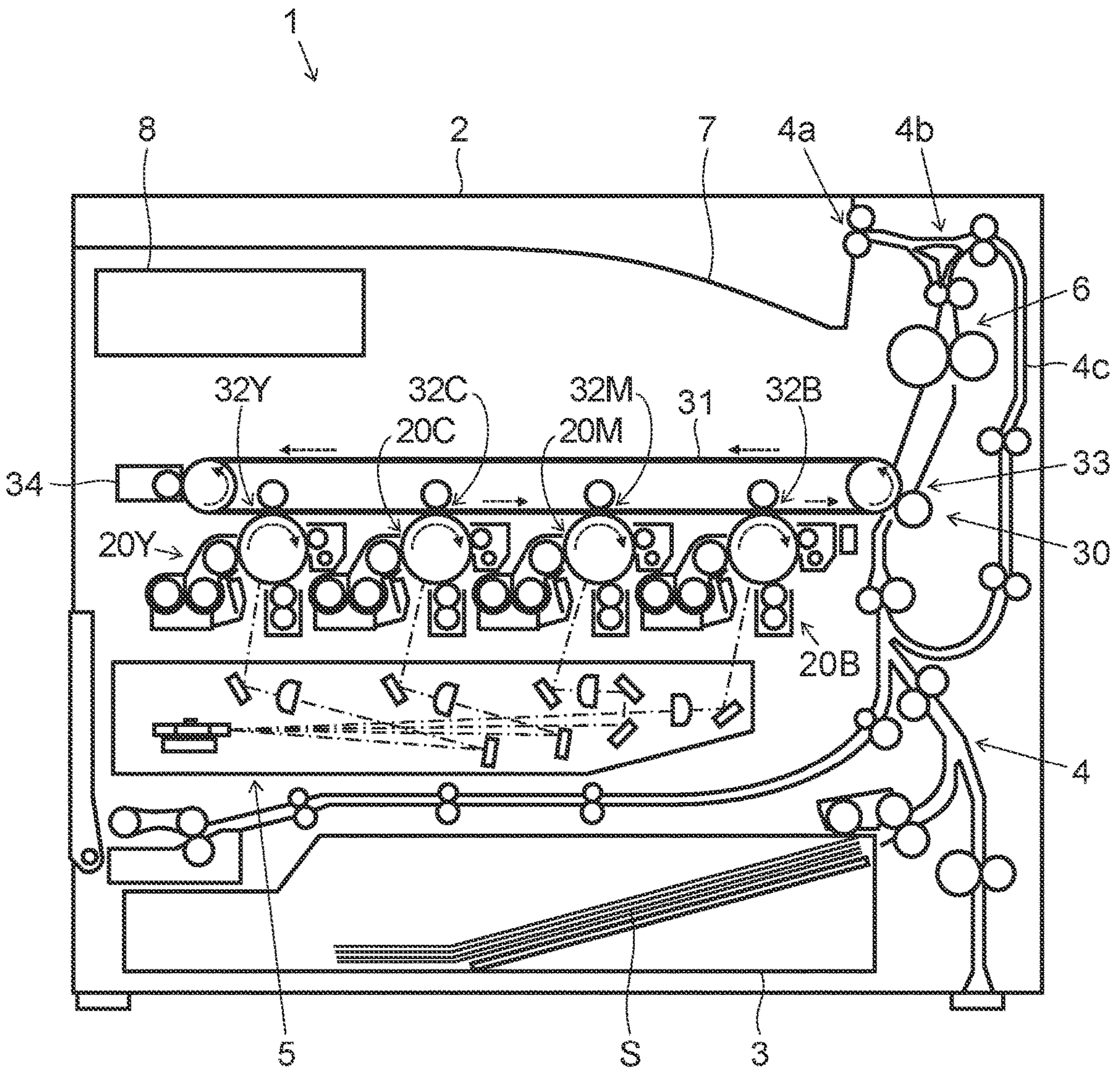
FIG. 1 is a schematic vertical sectional front view of an image forming apparatus according to one embodiment of the present disclosure.
Figure 2:
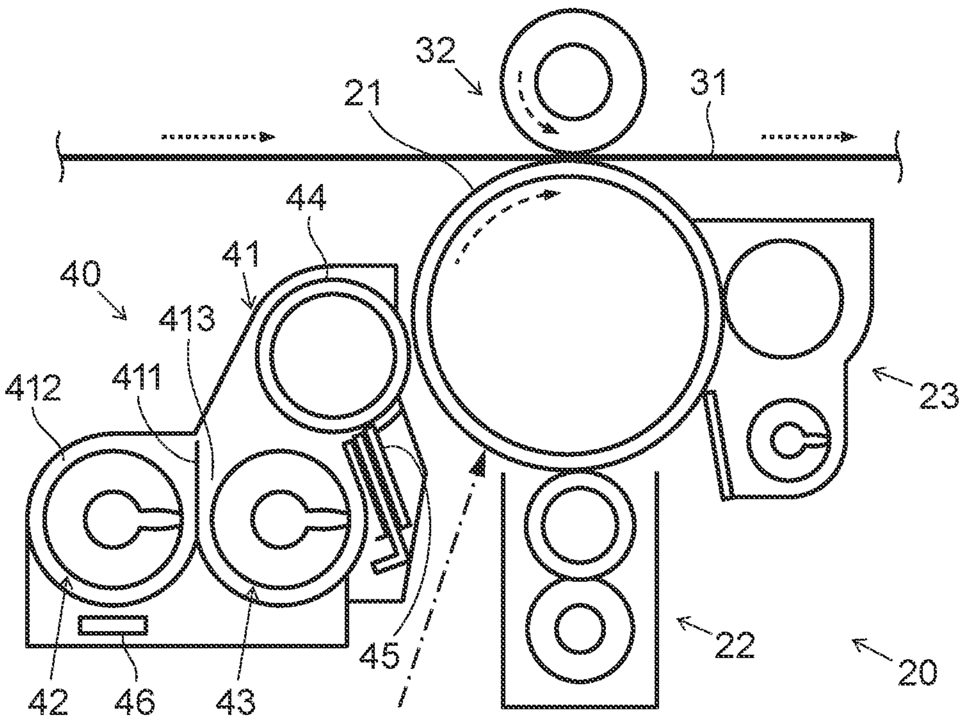
FIG. 2 is a schematic vertical sectional front view of an area around an image forming portion of the image forming apparatus shown in FIG. 1.

FIG. 1 is a schematic vertical sectional front view of an image forming apparatus 1 according to an embodiment. FIG. 2 is a schematic vertical sectional front view of an area around an image forming portion 20 of the image forming apparatus 1 shown in FIG. 1. An example of the image forming apparatus 1 according to the present embodiment is a tandem-type color printer that uses an intermediate transfer belt 31 to transfer a toner image onto a sheet S. The image forming apparatus 1 may be what is called a multifunction peripheral which is equipped with functions of, for example, printing, scanning (image reading), facsimile transmission, etc.

As shown in FIG. 1 and FIG. 2, the image forming apparatus 1 includes, in a main body 2 thereof, a sheet feeding portion 3, a sheet conveying portion 4, an exposure portion 5, the image forming portion 20, a transfer portion 30, a fixing portion 6, a sheet discharge portion 7, and a control portion 8.

The sheet feeding portion 3 is arranged at a bottom portion of the main body 2. The sheet feeding portion 3 stores a plurality of sheets S and, during printing, feeds them out separately one by one. The sheet conveying portion 4 conveys a sheet S fed out from the sheet feeding portion 3 to a secondary transfer portion 33 and then to the fixing portion 6, and further discharges the sheet S having an image fixed thereon through a sheet discharge port **4*a* to the sheet discharge portion 7. For two-sided printing, the sheet conveying portion 4 sorts, with a branch portion 4*b*, the sheet S having an image fixed on its first side into an inverting conveying portion 4*c*, and once again conveys the sheet S to the secondary transfer portion 33 and then to the fixing portion 6. The exposure portion 5 irradiates the image forming portion 20** with laser light that is controlled based on image data.

The image forming portion 20 is arranged below the intermediate transfer belt 31. The image forming portion 20 includes an image forming portion 20Y for yellow, an image forming portion 20C for cyan, an image forming portion 20M for magenta, and an image forming portion 20B for black. The four image forming portions 20 are similar to each other in basic configuration. Thus, hereinafter, the color signs 'Y', 'C', 'M', and 'B' provided for distinction among the different colors may sometimes be omitted unless such distinction is necessary.

The image forming portion 20 includes a photoconductive drum (an image carrier) 21 supported to be rotatable in a predetermined direction (a clockwise direction in FIG. 1 and FIG. 2). The image forming portion 20 further includes a charging portion 22, a developing device 40, and a drum cleaning portion 23 arranged around the photoconductive drum 21 along a rotation direction of the photoconductive drum 21. Between the developing device 40 and the drum cleaning portion 23, primary transfer portions 32 are arranged.

The photoconductive drum 21 is formed in a horizontally-extending cylindrical shape, and has a photoconductive layer on an outer circumferential surface thereof. The charging portion 22 charges the surface of the photoconductive drum 21 to a predetermined potential. The exposure portion 5 exposes, to light, the surface of the photoconductive drum 21 having been charged by the charging portion 22, thereby forming an electrostatic latent image of a document image. The developing device 40 supplies toner to the thus formed electrostatic latent image, thereby developing the electrostatic latent image into a toner image. The four image forming portions 20 respectively form toner images of different colors. The drum cleaning portion 23, after the toner image is primarily transferred onto a surface of the intermediate transfer belt 31, performs cleaning by removing residual toner and the like from the surface of the photoconductive drum 21. This is how the image forming portions 20 perform image formation on the sheet S.

The transfer portion 30 includes the intermediate transfer belt 31, the primary transfer portions 32Y, 32C, 32M, and 32B, the secondary transfer portion 33, and a belt cleaning portion 34. The intermediate transfer belt 31 is arranged above the four image forming portions 20. The intermediate transfer belt 31 is supported to be rotatable in a predetermined direction (a counterclockwise direction in FIG. 1). The intermediate transfer belt 31 is an intermediate transfer body, onto which toner images formed on the surfaces of the photoconductive drums 21 of the four image forming portions 20 are primarily transferred in such a manner as to be sequentially superposed one on top of another. The four image forming portions 20 are aligned from an upstream side toward a downstream side of the intermediate transfer belt 31 in a rotation direction of the intermediate transfer belt 31 in what is called a tandem-type arrangement.

The primary transfer portions 32Y, 32C, 32M, and 32B are respectively arranged above the image forming portions 20Y, 20C, 20M, and 20B of the different colors, with the intermediate transfer belt 31 located therebetween. The secondary transfer portion 33 is arranged at a position that is, in the sheet conveying portion 4, on an upstream side of the fixing portion 6 in a sheet conveyance direction, and that is, in the transfer portion 30, on a downstream side of the image forming portions 20Y, 20C, 20M, and 20B of the different colors in the rotation direction of the intermediate transfer belt 31. The belt cleaning portion 34 is arranged on an upstream side of the image forming portions 20Y, 20C, 20M, and 20B of the different colors in the rotation direction of the intermediate transfer belt 31.

Toner images are primarily transferred, at the primary transfer portions 32Y, 32C, 32M, and 32B of the different colors, onto the surface of the intermediate transfer belt 31. Then, along with rotation of the intermediate transfer belt 31, at predetermined timing, the toner images formed at the four image forming portions 20 are sequentially transferred onto the intermediate transfer belt 31 to be superposed one on top of another, and thereby, on the surface of the intermediate transfer belt 31, a color toner image is formed in which toner images of the four colors, namely, yellow, cyan, magenta, and black, are superposed one on top of another.

The color toner image formed on the surface of the intermediate transfer belt 31 is transferred onto a sheet S having been synchronously conveyed by the sheet conveying portion 4, at a secondary transfer nip portion formed at the secondary transfer portion 33. The belt cleaning portion 34 performs cleaning by removing residual toner and the like left on the intermediate transfer belt 31 after the secondary transfer.

The fixing portion 6 is arranged above the secondary transfer portion 33. The fixing portion 6 applies heat and pressure to the sheet S onto which the toner image has been transferred, and thereby fixes the toner image on the sheet S.

The sheet discharge portion 7 is arranged above the transfer portion 30. The printed sheet S having the toner image fixed thereon is conveyed to the sheet discharge portion 7.

The control portion 8 includes a CPU, an image processor, a storage, and other electronic circuits and electronic parts (of which none is illustrated). The CPU controls operations of various components provided in the image forming apparatus 1 on the basis of a control program and control data stored in the storage, and thereby performs processing related to functions of the image forming apparatus 1. The sheet feeding portion 3, the sheet conveying portion 4, the exposure portion 5, the image forming portions 20, the transfer portion 30, and the fixing portion 6 each individually receive a command from the control portion 8, and cooperate with each other to perform printing with respect to a sheet S. The storage is configured, for example, as a combination of non-volatile storage devices such as a program ROM (read only memory), a data ROM, etc., and a volatile storage device such as a RAM (random access memory).

Figure 3:
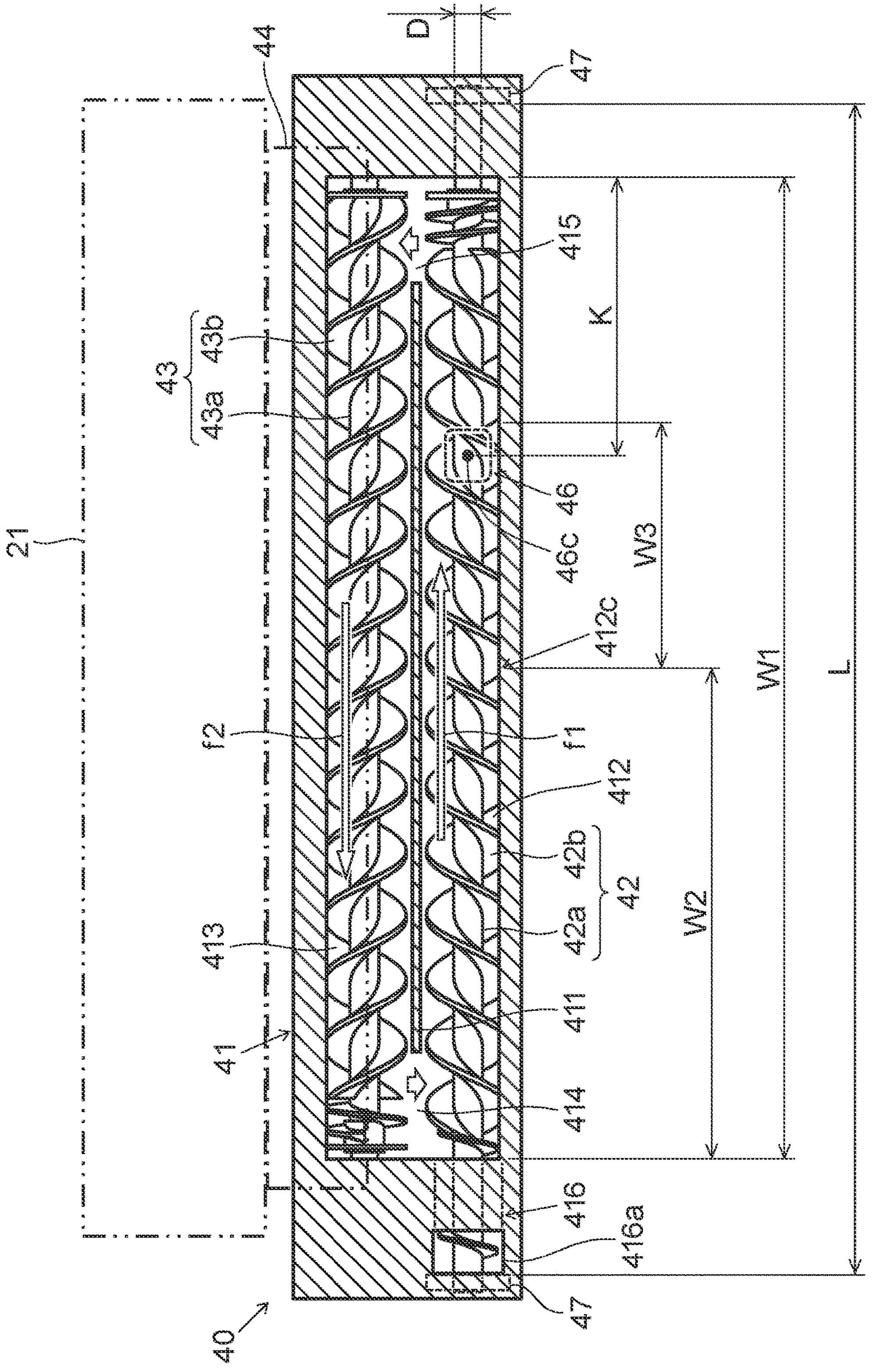
FIG. 3 is a horizontal sectional plan view of a developing device of the image forming portion shown in FIG. 2.

Described next is a configuration of the developing device 40, with reference to FIG. 3 as well as FIG. 2. FIG. 3 is a horizontal sectional plan view of the developing device 40 in the image forming portion 20 shown in FIG. 2. The developing devices 40 of the different colors are similar to each other in basic configuration, and thus, regarding their components, their color signs and their overlapping descriptions will be omitted. In the descriptions herein, an "axis direction" refers to a rotational axis direction of each of the photoconductive drum 21, a first conveying member 42, a second conveying member 43, and a developing roller 44, all of which extend parallel to each other (a depth direction of the sheet of FIG. 2, a left-right lateral direction in FIG. 3), and the axis direction coincides with a width direction that is orthogonal to a conveyance direction in which a sheet S is conveyed.

The developing device 40 supplies toner to the surface of the photoconductive drum 21. The developing device 40 includes a development container 41, the first conveying member 42, the second conveying member 43, a developing roller (developer carrier) 44, a regulation member 45, and a toner concentration sensor 46.

The development container 41 has an elongate shape extending along the axis direction of the photoconductive drum 21, and is arranged such that a longitudinal direction thereof is horizontal. That is, the longitudinal direction of the development container 41 is parallel to the axis direction of the photoconductive drum 21. The development container 41 stores, as a developer including a toner to be supplied to the photoconductive drum 21, a two-component developer that includes a toner and a magnetic carrier, for example.

The development container 41 includes a partition portion 411, a first conveying chamber 412, a second conveying chamber 413, a first communication portion 414, a second communication portion 415, and a developer supply portion 416.

The partition portion 411 is provided at a lower portion inside the development container 41. The partition portion 411 is arranged substantially at a center portion of the development container 41 in a direction intersecting with the longitudinal direction of the development container 41 (a left-right lateral direction in FIG. 2, an up-down direction in FIG. 3). The partition portion 411 is substantially plate-shaped, extending in the longitudinal direction of the development container 41 and in an up-down direction. The partition portion 411 divides an inside of the development container 41 in the direction intersecting with the longitudinal direction of the development container 41.

The first conveying chamber 412 and the second conveying chamber 413 are provided inside the development container 41. The first conveying chamber 412 and the second conveying chamber 413 are formed by dividing the inside of the development container 41 with the partition portion 411. The first conveying chamber 412 and the second conveying chamber 413 are arranged parallel to each other and substantially to a same height.

The second conveying chamber 413 is arranged at a position that is inside the development container 41 and that is adjacent to a region where the developing roller 44 is arranged. The first conveying chamber 412 is arranged inside the development container 41, in a region that is more away from the developing roller 44 than the second conveying chamber 413 is. The first conveying chamber 412 has connected thereto, at an upstream side thereof in a later-described first direction f1, the developer supply portion 416 that has a developer supply port 416*a*. The developer supply port 416*a* is formed in a wall portion of the developer supply portion 416 on the upstream side of the first conveying chamber 412 in the first direction f1, and the developer is supplied to the first conveying chamber 412 through the developer supply port 416*a*.

The first communication portion 414 and the second communication portion 415 are respectively arranged outside opposite end portions of the partition portion 411 in the longitudinal direction thereof. The first communication portion 414 and the second communication portion 415 allow the first conveying chamber 412 and the second conveying chamber 413 to communicate with each other in the direction intersecting with the longitudinal direction of the partition portion 411 (the left-right lateral direction in FIG. 2, the up-down direction in FIG. 3), that is, in a thickness direction of the partition portion 411 which is substantially plate-shaped. In other words, via the first communication portion 414 and the second communication portion 415, the first conveying chamber 412 and the second conveying chamber 413 communicate with each other at their opposite end-portion sides in their longitudinal directions.

The first conveying member 42 is arranged inside the first conveying chamber 412. The second conveying member 43 is arranged inside the second conveying chamber 413. The second conveying member 43 extends close and parallel to the developing roller 44. The first conveying member 42 and the second conveying member 43 are each supported in the development container 41 to be rotatable about an axis horizontally extending parallel to the developing roller 44. The first conveying member 42 and the second conveying member 43 are similar to each other in basic configuration.

The first conveying member 42 includes a rotation shaft 42*a* extending along the longitudinal direction of the development container 41 and a conveying blade 42*b* helically formed on an outer circumferential portion of the rotation shaft 42*a*. The second conveying member 43 includes a rotation shaft 43*a* extending along the longitudinal direction of the development container 41 and a conveying blade 43*b* helically formed on an outer circumferential portion of the rotation shaft 43*a*.

The first conveying member 42, inside the first conveying chamber 412, conveys, while stirring, the developer in the first direction f1 directed from the first communication portion 414 toward the second communication portion 415 along the rotational axis direction of the first conveying member 42. The second conveying member 43, inside the second conveying chamber 413, conveys, while stirring, the developer in a second direction f2 directed from the second communication portion 415 toward the first communication portion 414 along the rotational axis direction of the second conveying member 43. The second direction f2 is opposite to the first direction f1.

The first communication portion 414 allows communication between a downstream end of the second conveying chamber 413 in the second direction f2 and an upstream end of the first conveying chamber 412 in the first direction f1. Through the first communication portion 414, the developer is conveyed from the second conveying chamber 413 toward the first conveying chamber 412. The second communication portion 415 allows communication between a downstream end of the first conveying chamber 412 in the first direction f1 and an upstream end of the second conveying chamber 413 in the second direction 2. Through the second communication portion 415, the developer is conveyed from the first conveying chamber 412 toward the second conveying chamber 413. White arrows in FIG. 3, including those indicating the first direction f1 and the second direction 12, indicate directions in which the developer is conveyed.

The developing roller 44 is arranged at a position that is inside the development container 41 and that is above the second conveying chamber 413. The developing roller 44 has a surface thereof partly exposed from the development container 41 to face the photoconductive drum 21. The developing roller 44 is supported in the development container 41 to be rotatable about an axis extending parallel to an axis of the photoconductive drum 21. The developing roller 44 carries thereon the developer in the second conveying chamber 413. The developing roller 44, at a facing region with respect to the photoconductive drum 21, supplies toner in the development container 41 to the surface of the photoconductive drum 21 to develop an electrostatic latent image into a toner image.

The regulation member 45 is arranged on an upstream side of the facing region between the developing roller 44 and the photoconductive drum 21 in the rotation direction of the developing roller 44. The regulation member 45 is arranged close to, and facing, the developing roller 44 with a predetermined space between a leading edge of the regulation member 45 and the surface of the developing roller 44. The regulation member 45 extends over an entire area in the axis direction of the developing roller 44. The regulation member 45 regulates layer thickness of the developer (toner) that is carried on the surface of the developing roller 44 and that passes through the space between the leading edge of the regulation member 45 and the surface of the developing roller 44.

The toner concentration sensor 46 is arranged at a wall portion of the first conveying chamber 412 along the first direction. In the present embodiment, a headless sensor is used as the toner concentration sensor 46. The toner concentration sensor 46 which is a headless sensor has a sensing surface that is embedded in an inner wall surface of the first conveying chamber 412. The toner concentration sensor 46 detects a toner concentration of the developer.

Specifically, the toner concentration sensor 46 is a sensor of a type that detects magnetic permeability, and obtains a toner concentration (a mixture ratio of the toner to the magnetic carrier in the developer) by detecting a change of the magnetic permeability of a two-component developer. The magnetic permeability changes with the ratio of the toner to the magnetic carrier in the developer inside the first conveying chamber 412, and in response to such changes, the toner concentration sensor 46 outputs different signals. The control portion 8, on the basis of an output signal received from the toner concentration sensor 46, controls start and stop of developer supply to the developing device 40.

The developer in the development container 41 is caused, by the rotation of the first conveying member 42 and of the second conveying member 43, to pass through the first communication portion 414 and the second communication portion 415 so as to circulate between the first conveying chamber 412 and the second conveying chamber 413 in a predetermined circulation direction. At this time, the toner in the development container 41 is stirred to be charged, to be then carried on the surface of the developing roller 44. The toner carried on the surface of the developing roller 44 has its layer thickness regulated by the regulation member 45, and then the toner is conveyed, by the rotation of the developing roller 44, to the facing region between the developing roller 44 and the photoconductive drum 21. When a predetermined developing voltage is applied to the developing roller 44, a potential difference is generated between the developing roller 44 and the surface of the photoconductive drum 21, and this causes the toner carried on the surface of the developing roller 44 to move onto the surface of the photoconductive drum 21 in the facing region. In this manner, an electrostatic latent image on the surface of the photoconductive drum 21 is developed with the toner.

Next, a description will be given of a more detailed configuration of the developing device 40 by using FIG. 3. In FIG. 3, an entire length W1 of the first conveying chamber 412 in its longitudinal direction (a sheet width direction), a length W2 which is equal to one half of the entire length W1, and a length W3 which is equal to one fourth of the entire length W1 are indicated.

As mentioned previously, the first conveying member 42 includes the rotation shaft 42*a* and the helical conveying blade 42*b*. The second conveying member 43 includes the rotation shaft 43*a* and the helical conveying blade 43*b*. The first conveying member 42 and the second conveying member 43 are equal to each other in outer diameter (outer diameter of the conveying blade) and in shaft diameter. Also, the first conveying member 42 and the second conveying member 43 are each formed such that the outer diameter is 2.3 times the shaft diameter or more but 3.0 times the shaft diameter or less.

As mentioned previously, the toner concentration sensor 46 is a headless sensor, and has a sensing surface that is embedded in the inner wall surface of the first conveying chamber 412. A center 46*c* of the sensing surface of the toner concentration sensor 46 is located in a region extending downstream in the first direction f1, from a center 412*c* of the first conveying chamber 412 in the longitudinal direction of the first conveying chamber 412, for a length equal to or less than the length W3 that is equal to one fourth of the entire length W1 of the first conveying chamber 412 in the longitudinal direction of the first conveying chamber 412.

Where D represents the shaft diameter of the first conveying member 42, L represents an axial length of the first conveying member 42, and K represents a distance of a position of the center 46*c* of the sensing surface of the toner concentration sensor 46 from the downstream end of the first conveying chamber 412 in the first direction f1, the developing device 40 satisfies formula (1) below.

$$500<(L^2 \times K)/D^4<2500 \quad (1)$$

Note that the axial length L of the first conveying member 42 is a length of the first conveying member 42 between two bearings 47 that respectively support opposite end portions of the rotation shaft 42*a* of the first conveying member 42 in the axis direction.

Evaluation was made of how the density of an image formed on a sheet S would be affected by a relationship, in the developing device 40, among the outer diameter of the first conveying member 42, the shaft diameter D of the first conveying member 42, the axial length L of the first conveying member 42, and the distance K of the position of the center 46*c* of the sensing surface of the toner concentration sensor 46 from the downstream end of the first conveying chamber 412 in the first direction f1. The result is shown in Table 1. Fourteen different samples (Examples 1 to 7, Comparative Examples 8 to 14) of the developing device 40 were prepared which were different from each other in external diameter, shaft diameter D, axial length L. and distance K, which are mentioned above, and densities of images formed on sheets S were evaluated after printing was performed on 10000 sheets by changing a coverage rate in a range from 2% to 50% each time printing was performed on five sheets.

TABLE 1

| | No. | Outer Diameter (mm) | Shaft Diameter D (mm) | Outer Diameter/ Shaft Diameter | Axial Length L (mm) | Sensor Center Position K (mm) | $(L^2 \times K)/D^4$ | Density Followability | Density Variation | Eval |
|---|---|---|---|---|---|---|---|---|---|---|
| Examples | 1 | 19 | 7 | 2.71 | 230 | 70 | 1542 | 0.03 | 0.02 | A |
| | 2 | 19 | 7 | 2.71 | 230 | 50 | 1102 | 0.04 | 0.04 | A |

TABLE 1-continued

| | No. | Outer Diameter (mm) | Shaft Diameter D (mm) | Outer Diameter/ Shift Diameter | Axial Length L (mm) | Sensor Center Position K (mm) | $(L^2 \times K)/D^4$ | Density Followability | Density Variation | Eval |
|---|---|---|---|---|---|---|---|---|---|---|
| | 3 | 19 | 7 | 2.71 | 230 | 40 | 881 | 0.05 | 0.09 | A |
| | 4 | 19 | 8 | 2.38 | 230 | 70 | 904 | 0.07 | 0.08 | A |
| | 5 | 19 | 7 | 2.71 | 250 | 80 | 2082 | 0.03 | 0.08 | A |
| | 6 | 17 | 7 | 2.43 | 230 | 70 | 1542 | 0.07 | 0.07 | A |
| | 7 | 21 | 7 | 3.00 | 230 | 70 | 1542 | 0.06 | 0.07 | A |
| | 8 | 19 | 9 | 2.11 | 230 | 70 | 564 | 0.12 | 0.05 | N/A |
| | 9 | 19 | 6 | 3.17 | 930 | 70 | 2857 | 0.05 | 0.12 | N/A |
| Comparative Examples | 10 | 19 | 6 | 3.17 | 250 | 80 | 3858 | 0.06 | 0.12 | N/A |
| | 11 | 17 | 6 | 2.83 | 230 | 70 | 2857 | 0.05 | 0.11 | N/A |
| | 12 | 17 | 5 | 3.40 | 230 | 70 | 5925 | 0.08 | 0.13 | N/A |
| | 13 | 17 | 8 | 2.13 | 230 | 70 | 904 | 0.13 | 0.06 | N/A |
| | 14 | 21 | 6 | 3.50 | 230 | 70 | 2857 | 0.05 | 0.14 | N/A |

As to the configuration and operation conditions of the image forming apparatus 1, the sheet size was A4 portrait (having a long side thereof parallel to the sheet width direction), the print speed was 45 sheets/minute, the distance between the photoconductive drum 21 and the developing roller 44 was 0.340±0.025 mm, and the ratio of circumferential speed of the developing roller 44 with respect to that of the photoconductive drum 21 was 1.8 (the facing region moving in a same direction). As to the developing device 40, the surface of the developing roller 44 had eighty rows of recesses formed in a circumferential direction by knurling, an outer diameter of the developing roller 44 was 20 mm, and a developer conveyance amount was 320 to 370 g/m$^2$. An alternating current bias of the developing voltage was a rectangular wave with a duty of 50%, a Vpp of 1360 V, and a frequency of 4 kHz. The toner was a positively chargeable toner having an outer diameter of 6.8 μm, and an initial toner concentration was 6%. A distance from a downstream end of the first conveying member 42 in the first direction to a nearest end portion of the partition portion 411, and a distance from a downstream end of the second conveying member 43 in the second direction to a nearest end portion of the partition portion 411 were both 30 mm.

As to image density, image density values (I.D.) were measured by using a fluorescence spectrodensitometer ("FD-5", a product of KONICA MINOLTA, INC.), and density followability and density variation were evaluated. The density followability was judged unacceptable if difference exceeded 0.1 between densities at leading and rear ends of a solid image formed over an entire surface of an A4 sheet in the sheet conveyance direction. The density variation was judged unacceptable if difference exceeded 0.1 between maximum and minimum values of densities measured at a total of six points on a solid image formed over the entire surface of an A4 sheet, the six points including three points (at a center and opposite-end sides) on each of the leading and rear ends of the solid image in the sheet-width direction. In the "Eval (=evaluation)" column in Table 1, "A" indicates that the density followability and the density variation were both acceptable, while "N/A" indicates that at least either the density followability or the density variation was unacceptable.

In each of the developing devices 40 of Examples 1 to 7 listed in Table 1, in both of the first conveying member 42 and the second conveying member 43, the outer diameter was 2.3 times the shaft diameter or more but 3.0 times the shaft diameter or less, and also the above formula (1) was satisfied. On the other hand, in each of the developing devices of Comparative Examples 8 to 14, at least either the condition that the first conveying member 42 and the second conveying member 43 each had an outer diameter that was 2.3 times a shaft diameter or more but 3.0 times the shaft diameter or less or the above formula (1) was not satisfied.

According to Table 1, it is clear that, with the developing device 40 of each of Examples 1 to 7, the density followability and the density variation were both less than 0.1, and a preferable image density was obtained. On the other hand, it is clear that, with the developing device of each of Comparative Examples 8 to 14, either the density followability or the density variation exceeded 0.1, and a preferable image density was not obtained.

As described above, by appropriately defining the relationship among the outer diameter, the shaft diameter, and the axial length of each of the first conveying member 42 and the second conveying member 43, it is possible to reduce warping of the first conveying member 42 and the second conveying member 43. This contributes to stable developer conveying performance and thus to reduction of unevenness in developer amount. Further, the toner concentration sensor 46 is a headless sensor and thus is prevented from direct contact with the developer in the development container 41. This helps to prevent the toner concentration sensor 46 from affecting a flow of the developer and from causing warping of the first conveying member 42 and the second conveying member 43. Moreover, by defining the distance K with respect to the first direction f1 of the first conveying chamber 412, it is possible to detect a toner concentration of the developer in a fully stirred state. That is, by appropriately defining the arrangement of the toner concentration sensor 46, it is possible to achieve more accurate detection of toner concentration. Thus, according to the configuration of the present embodiment, it is possible to obtain a preferable image density and thus to achieve high-quality image formation.

Next, the carrier included in the developer has a carrier core that is a magnetic particle and a coat layer made of, for example, a silicone resin on a surface of the carrier core. Silicone-based resins allow thin-layer coating and high uniformly of a coat layer. Further, as the coat layer is made thinner, the coat layer is given a higher electrostatic capacity, and a ferroelectric substance added to the coat layer exerts its effect more efficiently.

The carrier may have a particle shape ranging from indefinite to spherical. Further, the carrier may have an average particle diameter that is equal to or more than 20 μm but is equal to or less than 65 μm. The number average particle diameter that is equal to or less than 65 μm helps to increase a specific surface area of the carrier and thus to increase an amount of toner that the carrier can carry thereon. Accordingly, the toner in a magnetic brush can be maintained at a high concentration, and a sufficient amount of toner is supplied to the developing roller 44, and thus a sufficient thickness of a toner layer can be secured. As a result, it is possible to secure a sufficient amount of toner to fly from the toner layer to an electrostatic latent image on the photoconductive body, and thus reduction of image density can be lessened, and further, unevenness in image density can be reduced. Moreover, since a sufficient amount of toner is supplied to the developing roller 44, it becomes less likely for the toner layer on the developing roller 44 to have a toner-missing part formed therein, and occurrence of a hysteresis phenomenon can be reduced.

If the average particle diameter of the carrier is less than 20 μm, carrier development occurs in which the carrier adheres to the photoconductive drum 21. The carrier adhered to the photoconductive drum 21 may then move to the intermediate transfer belt 31 to cause a transfer void, or may move further to the belt cleaning portion 34 to cause poor cleaning. If the average particle diameter of the carrier is more than 65 μm, in making toner in a two-component developer move from the developing roller 44 to the photoconductive drum 21, a coarse magnetic brush of the two-component developer is formed, and this may result in deterioration of image quality.

The carrier core may be made of, for example: magnetic metals such as iron, nickel, and cobalt, and alloys thereof, or alloys containing a rare earth element; soft ferrites such as hematite, magnetite, manganese-zinc-based ferrite, nickel-zinc-based ferrite, manganese-magnesium-based ferrite, and lithium-based ferrite; iron-based oxides such as copper-zinc-based ferrite; and mixtures of these. The carrier core is produced by known methods such as sintering, atomizing, etc. Among the above materials, ferrite carriers have a good flowability and are chemically stable, and thus are preferably used in view of achieving a higher image quality and a longer life.

The coat layer has barium titanate particles added thereto as a ferroelectric substance. Known methods for producing barium titanate include a hydrothermal polymerization method, an oxalate method, etc., and barium titanate has different physical characteristics depending on how it is produced. Especially, barium titanate produced using the hydrothermal polymerization method has a hollow inside thereof and thus has a small true specific gravity, and also has a sharp distribution of particle size. As a result, in comparison with barium titanate produced using other methods, the barium titanate produced by the hydrothermal polymerization method disperses more efficiently in a coat resin, and this helps to achieve uniform dispersion in the coat resin. Accordingly, uniform charging performance of the carrier is also achieved, and thus barium titanate produced using the hydrothermal polymerization method is suitable for use in the present embodiment.

The barium titanate preferably has a volume average particle diameter that is equal to or more than 100 nm but is equal to or less than 500 nm. If the particle diameter of the barium titanate is less than 100 nm, a specific permittivity of the barium titanate drops sharply, resulting in a smaller advantage related to the specific permittivity. On the other hand, if the particle diameter of the barium titanate is equal to or more than 500 nm, it is difficult to achieve uniform dispersion in the coat layer.

If the barium titanate is added in an amount of 5 parts by mass or more with respect to a coat weight, an effect of stabilizing charge amount starts to be exerted, while, if the barium titanate is added in an amount of 25 parts by mass or more, the effect of stabilizing the charge amount appears more remarkably. If, however, an excessive amount of barium titanate is added, the coat layer fails to hold the barium titanate all therein, so that some of the barium titanate may be released from the coat layer. If such released barium titanate moves to the photoconductive drum 21 and further moves to the drum cleaning portion 23 to be stuck to an edge portion of a cleaning blade of the drum cleaning portion 23, it may cause poor cleaning. In particular, in a case where the carrier is mixed with the toner in a toner container (unillustrated) and then supplied to the developing device 40, supply of the barium titanate released through use to the developing device 40 may increase load on the cleaning blade. Thus, it is preferable that the amount of barium titanate to be added be equal to or more than 5 parts by mass but equal to or less than 45 parts by mass.

The coat layer has carbon black added thereto as an electrically conductive substance. If an excessive amount of carbon black is added, some of the carbon black may become released from the coat layer to adhere to toner, thereby causing turbidity in colors of toners other than a black toner. On the other hand, if an insufficient amount of carbon black is added, transfer of charge from the carrier to the toner is reduced, and this prevents a smooth rise in toner charge amount. In the carrier according to the present embodiment, the addition of the barium titanate (a ferroelectric substance) to the coat layer helps to reduce resistance of the carrier, and thus it is possible to reduce the amount of carbon black to be added by an amount corresponding to the reduction of the resistance of the carrier.

The addition of the ferroelectric substance (the barium titanate) to the coat layer allows the carrier to have a high charge holding capacity and thus to give sufficient charge to the toner. Further, the addition of the electrically conductive substance (the carbon black) to the coat layer makes it possible to achieve smooth transfer of charge from the carrier to the toner. These two, in synergy with each other, make it possible to provide charge to the toner particles up to their saturation charge level even when the toner concentration has increased to increase the number of toner particles to be charged.

By adjusting the amounts of ferroelectric substance and electrically conductive substance with respect to the coat layer, the particle diameter, and the thickness of the coat layer, the carrier according to the present embodiment is designed such that the following formula (2) is satisfied.

$$0.73 \leq FR-AD/\text{Shape Coefficient} \leq 2.10 \quad (2)$$

With this design, stable toner chargeability is achieved and a state that is free from image fogging can be maintained over a long period time.

The "Shape Coefficient" in formula (2) is a coefficient representing particle shape, and is defined by the following formula (3).

$$\text{Shape Coefficient} = \text{Measured Carrier Volume Average Particle Diameter}/\text{Carrier Particle Diameter Calculated from BET Specific Surface Area} \quad (3)$$

where $$\text{Carrier Particle Diameter Calculated from BET Specific Surface Area} = 6/(\text{BET Specific Surface Area} \times \text{True Specific Gravity}).$$

If the shape coefficient becomes too large, the shape coefficient becomes liable to change due to scraping-off of the coat layer during durable printing, for example, and durable stability are degraded. On the other hand, if the shape coefficient is too small, toner chargeability is degraded. Thus, an appropriate range exists for the shape coefficient.

The BET specific surface area is a specific surface area measured using a BET method (a nitrogen adsorption specific surface area method), and specifically, it is obtained from an amount of liquid nitrogen adsorbed to a surface of the carrier. More specifically, for example, using a full-automatic specific surface area measuring device (Macsorb (registered trademark) model 1208) produced by Mountech Co., Ltd., or the like, by having nitrogen adsorbed on a surface of a sample, using a flow method (a BET one-point method), the BET specific surface area ($m^2/g$) of the sample can be measured.

"FR×AD" in formula (2) is an index that indicates flowability of the carrier. When the flowability of the carrier is too high, mixability of the carrier with the toner is lowered and the toner chargeability may be lowered. On the other hand, when the flowability of the carrier is too low, developer conveying speed inside the development container 41 is lowered, and after continuous printing of high coverage-rate images, the image density is lowered. Thus, an appropriate range exists for the flowability of the carrier.

"FR" represents carrier fluidity, which is a value (s/50 g) that indicates a period of time taken to discharge 50 grams of the carrier. An amount of discharged carrier better coincides with actual behavior when considered in volume than in weight, and thus, in the present embodiment, used as the index of the flowability of the carrier is "FR×AD" obtained by amending "FR" by bulk specific gravity AD $g/cm^3$ of the carrier.

"FR" can be measured according to "JIS (Japanese Industrial Standards)-Z2502." Specifically, using a metal funnel (cone angle: 60 degrees, orifice diameter: 2.5 mm, orifice length: 3.2 mm), with the orifice of the funnel closed, 50 grams of the sample (the carrier) is put in the funnel. Then, simultaneously with opening the orifice of the funnel, timing is started using a stopwatch, and at the moment when the last portion of the carrier leaves the orifice, the timing is finished. The thus measured time (transit time) equals "FR." "AD" can be measured according to "Metallic powders-Determination of apparent density JIS Z2504."

If the carrier satisfies the above formula (2), charge amount variation is reduced, and thus it is possible to reduce image density variation and to achieve stable concentration control. Accordingly, a preferable image density can be obtained and high-quality image formation can be achieved.

The above-described embodiment is by no means meant to limit the scope of the present disclosure, and various modifications can be made within the scope not departing from the gist of the present disclosure.

For example, in the above embodiment, the image forming apparatus 1 is described as what is called a tandem-type image forming apparatus for color printing, which sequentially forms images of a plurality of colors one on top of another, but the image forming apparatus 1 is not limited to an image forming apparatus of such a type. The image forming apparatus may be a non-tandem type color image forming apparatus or a monochrome image forming apparatus.

What is claimed is:

1. A developing device, comprising:

a development container which includes a first conveying chamber and a second conveying chamber arranged parallel to each other and communicating with each other at opposite end portion sides thereof in longitudinal directions thereof, and which stores a two-component developer including a toner and a carrier;

a first conveying member which is rotatably arranged in the first conveying chamber and which conveys, while stirring, the developer in the first conveying chamber in a first direction along the longitudinal direction of the first conveying chamber;

a second conveying member which is rotatably arranged in the second conveying chamber and which conveys, while stirring, the developer in the second conveying chamber in a second direction along the longitudinal direction of the second conveying chamber, the second direction being opposite to the first direction;

a developer supply port which is arranged in an upstream-side wall portion of the first conveying chamber in the first direction, and through which the developer is supplied to the first conveying chamber;

a toner concentration sensor which is arranged at a wall portion of the first conveying chamber along the first direction, and which detects a toner concentration of the developer; and a developer carrier which is rotatably supported in the development container, and which carries thereon the developer in the second conveying chamber, wherein the first conveying member and the second conveying member each include a rotation shaft extending along a longitudinal direction of the development container, and a conveying blade formed on an outer circumferential portion of the rotation shaft, the first conveying member and the second conveying member being equal to each other in outer diameter and in shaft diameter, the outer diameter being 2.3 times the shaft diameter or more but 3.0 times the shaft diameter or less, the toner concentration sensor is a headless sensor and has a sensing surface embedded in an inner wall surface of the first conveying chamber, a center of the sensing surface of the toner concentration sensor is located in a region extending downstream, in the first direction, from a center of the first conveying chamber in the longitudinal direction of the first conveying chamber, for a length that is equal to or less than one fourth of an entire length of the first conveying chamber in the longitudinal direction thereof, and where D [mm] represents the shaft diameter of the first conveying member, L [mm] represents an axial length of the first conveying member, and K [mm] represents a distance of a center position of the sensing surface of the toner concentration sensor from a downstream end of the first conveying chamber in the first direction, formula (1) below is satisfied:

$$500[mm^{-1}]<(L^2\times K)/D^4<2500[mm^{-1}] \quad (1).$$

2. The developing device according to claim 1, wherein the carrier has a carrier core that is a magnetic particle and a resin coat layer that is formed on a surface of the carrier core, and the carrier satisfies formula (2) below:

$$0.73[(s/50g)\times(g/cm^3)]\leq FR\times AD/\text{Shape Coefficient}\leq 2.10[(s/50g)\times(g/cm^3)] \quad (2)$$

where

FR represents a period of time (s/50 g) taken to discharge 50 grams of the carrier, AD represents a bulk specific gravity ($g/cm^3$) of the carrier, and Shape Coefficient equals (Measured Carrier Volume Average Particle Diameter)/(Carrier Particle Diameter Calculated from BET Specific Surface Area).

3. An image forming apparatus, comprising:

an image carrier; and the developing device according to claim 2 which develops, with the toner, an electrostatic latent image formed on a surface of the image carrier to thereby form a toner image.

4. An image forming apparatus, comprising:

an image carrier; and the developing device according to claim 1 which develops, with the toner, an electrostatic latent image formed on a surface of the image carrier to thereby form a toner image.

* * * * *